US010993118B2

(12) United States Patent
Zhang

(10) Patent No.: US 10,993,118 B2
(45) Date of Patent: Apr. 27, 2021

(54) SPECTRUM SHARING INFRASTRUCTURE

(71) Applicant: Ford Global Technologies, LLC, Dearborn, MI (US)

(72) Inventor: Linjun Zhang, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/426,931

(22) Filed: May 30, 2019

(65) Prior Publication Data
US 2020/0382962 A1 Dec. 3, 2020

(51) Int. Cl.
| *H04B 7/00* | (2006.01) |
| *H04W 16/14* | (2009.01) |
| *H04W 4/80* | (2018.01) |
| *H04W 76/30* | (2018.01) |
| *H04W 4/38* | (2018.01) |
| *H04W 4/44* | (2018.01) |
| *H04B 17/318* | (2015.01) |
| *H04W 24/08* | (2009.01) |
| *H04W 84/12* | (2009.01) |

(52) U.S. Cl.
CPC .......... *H04W 16/14* (2013.01); *H04B 17/318* (2015.01); *H04W 4/38* (2018.02); *H04W 4/44* (2018.02); *H04W 4/80* (2018.02); *H04W 24/08* (2013.01); *H04W 76/30* (2018.02); *H04W 84/12* (2013.01)

(58) Field of Classification Search
CPC ......... H04W 16/14; H04W 4/38; H04W 4/44; H04W 76/30; H04W 4/80; H04W 24/08; H04W 84/12; H04B 17/318

USPC .......................................... 455/41.2
See application file for complete search history.

(56) References Cited

U.S. PATENT DOCUMENTS

| 7,844,247 B2* | 11/2010 | Chen ................. G08G 1/205 455/404.1 |
| 8,676,920 B2* | 3/2014 | Bai .................. H04L 67/12 709/214 |
| 8,705,527 B1* | 4/2014 | Addepalli ............ B60R 16/023 370/389 |
| 9,031,498 B1* | 5/2015 | Bertz ................. H04W 72/04 455/13.1 |
| 9,503,839 B2* | 11/2016 | Jose .................. H04W 4/80 |
| 10,122,790 B2* | 11/2018 | Cardote ............. H04W 4/80 |
| 2011/0295458 A1* | 12/2011 | Halsey-Fenderson ................. G10L 13/00 701/29.1 |
| 2013/0122928 A1* | 5/2013 | Pfluger ............... G01P 13/00 455/456.1 |
| 2013/0217331 A1* | 8/2013 | Manente ............. H04W 4/80 455/41.2 |

(Continued)

FOREIGN PATENT DOCUMENTS

WO 2018217178 A1 11/2018

*Primary Examiner* — April G Gonzales
(74) *Attorney, Agent, or Firm* — Frank A. MacKenzie; Bejin Bieneman PLC

(57) ABSTRACT

A computer includes a processor and a memory. The memory includes instructions such that the processor is programmed to determine a potential loading of a radio frequency communications channel in an area by vehicle short-range communications based on data collected by sensors on an infrastructure device. The processor is further programmed to activate or deactivate a Wi-Fi device in the area based on the determination of the potential loading of the radio frequency communications channel.

20 Claims, 3 Drawing Sheets

(56) References Cited

U.S. PATENT DOCUMENTS

| | | | | |
|---|---|---|---|---|
| 2014/0378054 A1* | 12/2014 | Wang | ............... | H04B 15/00 455/41.2 |
| 2015/0005024 A1* | 1/2015 | Fudickar | ............ | H04W 4/02 455/509 |
| 2015/0189462 A1* | 7/2015 | Fujii | ............. | H04W 4/80 455/41.2 |
| 2015/0201297 A1* | 7/2015 | Sauerbrey | ........... | H04W 4/80 340/436 |
| 2015/0230286 A1* | 8/2015 | Feuersaenger | ....... | H04W 24/10 370/252 |
| 2016/0050531 A1* | 2/2016 | Choi | ............ | H04W 4/027 455/456.2 |
| 2016/0088422 A1* | 3/2016 | Foster | ........... | H04W 4/48 455/41.2 |
| 2017/0013467 A1* | 1/2017 | Azizi | ............ | H04W 74/085 |
| 2017/0339580 A1* | 11/2017 | Martin | ........... | H04W 24/02 |
| 2018/0115915 A1* | 4/2018 | Loeffler | ......... | H04W 24/02 |
| 2018/0294667 A1* | 10/2018 | Oliverio | ......... | B60R 16/03 |

* cited by examiner

SPECTRUM SHARING INFRASTRUCTURE

BACKGROUND

Wi-Fi devices located along roads, may, in some cases, utilize frequency channels that are also used by vehicle short-range communications systems such as those based on the dedicated short-range communications (DSRC) protocol. Transmissions from the Wi-Fi devices may interfere with the vehicle short-range communications.

DETAILED DESCRIPTION

Introduction

Figure 1:
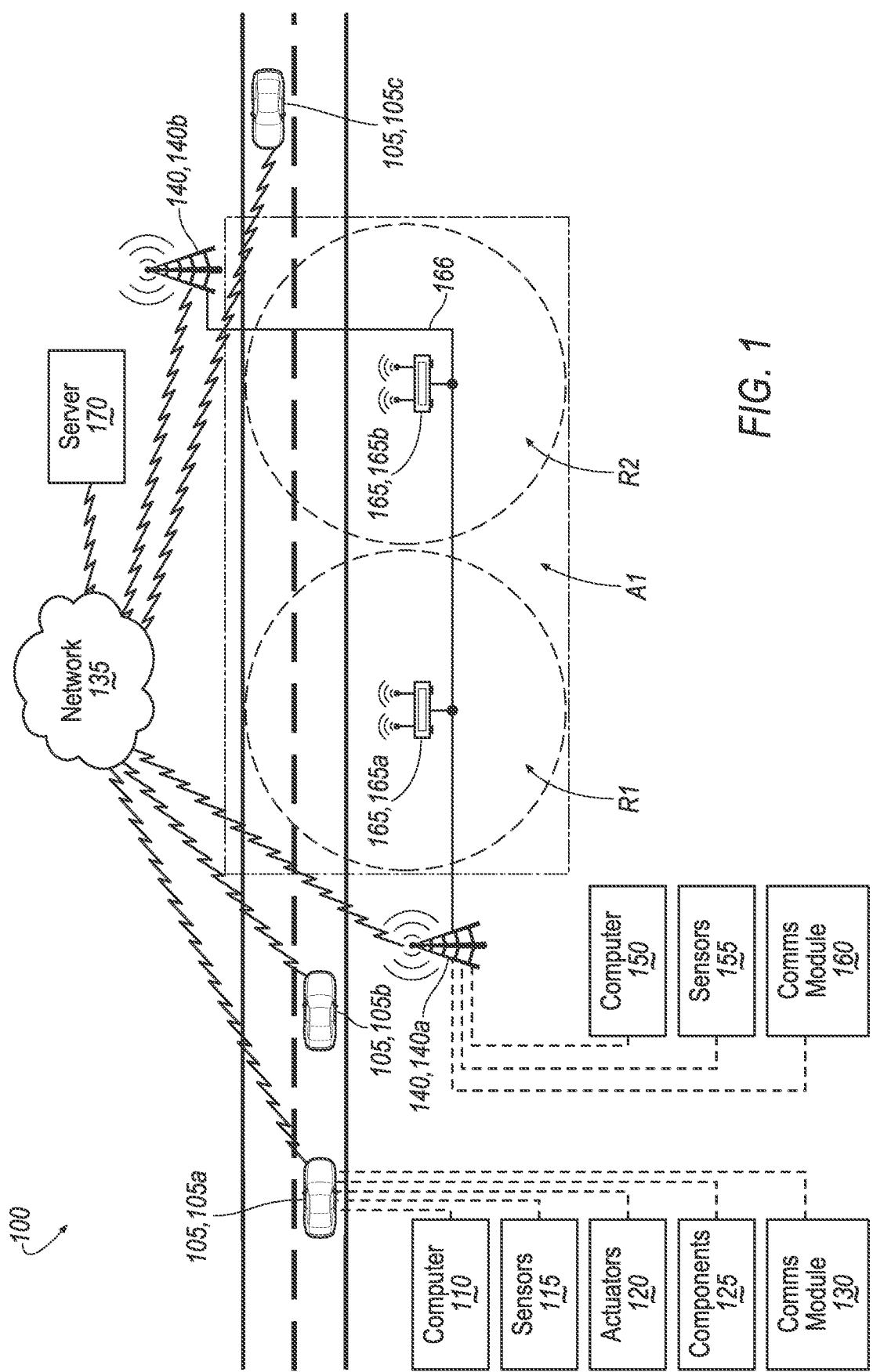
FIG. 1 is a diagram illustrating an example system for a smart infrastructure for spectrum sharing.

Disclosed is a computer comprises a processor and a memory. The memory includes instructions such that the processor is programmed to determine a potential loading of a radio frequency communications channel in an area by vehicle short-range communications based on data collected by sensors on an infrastructure device; and activate or deactivate a Wi-Fi device in the area based on the determination of the potential loading of the radio frequency communications channel.

The computer can further be programmed to deactivate the Wi-Fi device based on a command received from a server.

The computer can be further programmed to deactivate the Wi-Fi device based on historical data indicating a number of vehicles greater than a threshold value in the area at a time-of-day.

The collected data can include a ratio of a usage time to a measurement time for the radio frequency communications channel.

The collected data can include a received signal strength indicator (RSSI) for signals received by one of the sensors on the infrastructure device at a time.

The data collected by the sensors on the infrastructure device can include a number of vehicles in the area.

The computer can be further programmed to estimate that the number of vehicles in the area will be greater than a threshold at a time; and deactivate a group of Wi-Fi devices in the area at the time.

The computer can be further programmed to determine that the potential loading is above a first threshold at a time; and deactivate a group of one or more Wi-Fi devices in the area based on the determination.

The computer can be further programmed to determine that the potential loading is below the first threshold, and above a second threshold; and deactivate a Wi-Fi device included in the group of one or more Wi-Fi devices when a number of vehicles within range of the Wi-Fi device is above a third threshold based on the determination that the potential loading is below the first threshold, and above a second threshold.

The computer can be further programmed to determine, for one or more vehicles, based on a respective location and a respective velocity, an estimated time that each of the one or more vehicles will be in the area, wherein the potential loading of the radio frequency communications channel is based on the determination.

Further disclosed is a method. The method comprises determining a potential loading of a radio frequency communications channel in an area by vehicle short-range communications based on data collected by sensors on an infrastructure device; and activating or deactivating a Wi-Fi device in the area based on the determination of the potential loading of the radio frequency communications channel.

The method can further comprise deactivating the Wi-Fi device based on a command received from a server.

The method can further comprise deactivating the Wi-Fi device based on historical data indicating a number of vehicles greater than a threshold value in the area at a time-of-day.

The collected data include a ratio of a usage time to a measurement time for the radio frequency communications channel.

The collected data includes a received signal strength indicator (RSSI) for signals received by one of the sensors on the infrastructure device at a time.

The data collected by the sensors on the infrastructure device includes a number of vehicles in the area.

The method can further comprise estimating that the number of vehicles in the area will be greater than a threshold at a time; and deactivating a group of Wi-Fi devices in the area at the time.

The method can further comprise determining that the potential loading is above a first threshold at a time; and deactivating a group of one or more Wi-Fi devices in the area based on the determination.

The method can further comprise determining that the potential loading is below the first threshold, and above a second threshold; and deactivating a Wi-Fi device included in the group of one or more Wi-Fi devices when a number of vehicles within range of the Wi-Fi device is above a third threshold based on the determination that the potential loading is below the first threshold, and above a second threshold.

The method can further comprise determining, for one or more vehicles, based on a respective location and a respective velocity, an estimated time that each of the one or more vehicles will be in the area, wherein the potential loading of the radio frequency communications channel is based on the determination.

Further disclosed herein is a computing device programmed to execute any of the above method steps.

Yet further disclosed herein is a computer program product, including a computer readable medium storing instructions executable by a computer processor, to execute an of the above method steps.

Exemplary System Elements

A system estimates a loading of a radio frequency communications channel that may be shared by vehicle short-range communications and Wi-Fi devices in an area. Based on the estimated loading, the system activates (turns on) and deactivates (turns off) the Wi-Fi devices sharing the channel. The system may estimate the loading based on data received from sensors on an infrastructure device, from data received from a server and/or from data received from vehicles in the area.

FIG. 1 is a block diagram of an example infrastructure communications and control system 100 that includes activating and deactivating one or more Wi-Fi devices 165 in an area A1. The area A1 is an area on or above the earth's surface (i.e., the area A1 is, strictly speaking, a space or volume) including a location of each of the Wi-Fi devices 165 and a respective communications range extending respectively from each of the Wi-Fi devices 165 within which radio frequency signals from the Wi-Fi devices 165 may interfere with short-range communications of vehicles 105. For example, in FIG. 1, the Wi-Fi device 165a has a communications range R1, and the Wi-Fi device 165b has a communications range R2. For practical purposes, the area A1 may extend beyond the communications ranges of the Wi-Fi devices 165. For example, the area A1 may include the ranges R1 and R2 and an area surrounding the ranges R1 and R2.

The system 100 includes one or more vehicles 105, a network 135, one or more infrastructure devices 140, one or more Wi-Fi devices 165, and a server 170. As described further below, the system 100 determines a potential loading of the radio frequency communications channel in the area A1 by vehicle short-range communications based on data collected by sensors 155 on the infrastructure device 140. The system 100 then activates or deactivates Wi-Fi devices 165 in the area based on the determination of the potential loading of the radio frequency communications channel in the respective ranges R1, R2. The system 100 may activate the Wi-Fi devices 165 as a group, or individually.

Each vehicle 105 is a land vehicle such as a car, truck, motorcycle, etc., and can include a vehicle computer 110, sensors 115, actuators 120 to actuate various vehicle components 125, and a vehicle communications module 130. Three vehicles 105 are shown in FIG. 1 for ease of illustration, but the system 100 can include one or more, for example, tens, hundreds or thousands, of vehicles 105.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network, more than one processor, e.g., included in electronic control units (ECUs) or the like included in the vehicle 105 for monitoring and/or controlling various vehicle components 125, e.g., a powertrain controller, a brake controller, a steering controller, etc. As used herein, the vehicle communications network is defined as one or more mechanisms for wired or wireless communications between systems and sub-systems of the vehicle 105. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

Via the vehicle communications network, the vehicle computer 110 may transmit messages to various systems and subsystems in the vehicle 105 and/or receive messages from the various devices, e.g., sensors 115, actuators 120, vehicle components 125, etc. Additionally, in cases where the vehicle computer 110 comprises a plurality of devices, the vehicle communications network may be used for communications between devices represented as the vehicle computer 110 in this disclosure.

Vehicle sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105.

The sensors 115 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine speed, brake pressure, etc.

The vehicle 105 actuators 120 are implemented via circuits, chips, or other electronic and or mechanical components that can actuate various vehicle subsystems in accordance with appropriate control signals as is known. The actuators 120 may be used to control vehicle components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, a suspension, an electronic stability control (ESC) module, a wiper control module, fog lights, etc.

In addition, the vehicle computer 110 may be configured for communicating via a vehicle communications module 130 with devices outside of the vehicle 105, e.g., through a vehicle-to-vehicle (V2V) or vehicle-to-infrastructure (V2X) wireless communications to another vehicle, to an infrastructure device 140 (typically via direct radio frequency communications) and/or (typically via the network 135) a server 170. The vehicle communications module 130 can include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module 130 include cellular, Bluetooth, IEEE 802.11, dedicated short-range communications (DSRC), cellular V2V, 5G/LTE and/or wide area networks (WAN), including the Internet, providing data communication services.

The network 135 represents one or more mechanisms by which each of the vehicles 105, the infrastructure devices 140 and the server 170 can communicate with each other. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

In addition to the network 135, one or more infrastructure devices 140 and/or one or more Wi-Fi devices 165 may be communicatively coupled by a second network 166. In an example, the second network 166 may be a wired, Ethernet network. The second network 166 may be separate from the network 135, as shown in FIG. 1, or may be included as a portion of the network 135. Realizing the second network 166 as a wired, Ethernet network may reduce the latency of communications from the infrastructure devices 140 to the Wi-Fi devices 165 and provide for timely activation and deactivation of the Wi-Fi devices 165 in response to commands from the infrastructure devices 140. Ethernet is only one example communications technology that may be used for the second network 166. Other wired and wireless communications technologies may also be used for communications between the infrastructure devices 140 and the Wi-Fi devices 165.

An infrastructure device 140 includes a physical structure such as a tower or other support structure (e.g., a pole, a box mountable to a bridge support, cell phone tower, road sign support, etc.) on which infrastructure sensors 155, as well as an infrastructure communications module 160 and an infrastructure computer 150 can be mounted, stored, and/or contained, and powered, etc. Two infrastructure devices 140 are shown in FIG. 1 for ease of illustration, but the system 100 could include one or more infrastructure devices 140. The infrastructure device 140 is typically stationary, i.e., fixed to and not able to move from a specific geographic location, and may be referred to herein as a stationary support structure.

The infrastructure sensors 155 may include one or more sensors such as, e.g., LIDAR, radar, cameras, ultrasonic sensors, etc. for detecting a presence of objects such as vehicles 105 in or approaching the area A1. The infrastructure sensors 155 may further include sensors, for example, in the communications module 160, for detecting parameters of signals received from the vehicles 105, the Wi-Fi devices 165 and the other infrastructure devices 140 in a range to be received by the infrastructure sensors 155. For example, the sensors 155 may detect a received signal strength indicator (RSSI) of signals received in a radio frequency communications channel intended for use by vehicles for short-range communications or may detect a ratio of a use time of the radio frequency communications channel to a measurement period of the usage.

The infrastructure sensors 155 may be fixed or stationary. That is, each infrastructure sensor 155 may be mounted to the infrastructure device 140 to have a substantially unmoving and unchanging field of view or communications range. Alternatively or additionally, an infrastructure sensor 155 could be mounted to rotate or otherwise move a field of view, e.g., on a movable arm, rotatable platform, or the like.

In a case of the system 100 having multiple infrastructure devices 140, one of the infrastructure devices 140 may assume responsibility for collecting and/or processing data collected from the other infrastructure devices 140 and for activating and deactivating the Wi-Fi devices 165 in the area.

The infrastructure communications module 160 and infrastructure computer 150 typically have features in common with the vehicle computer 110 and vehicle communications module 130, and therefore will not be described further to avoid redundancy. Although not shown for ease of illustration, the infrastructure device 140 also includes a power source such as a battery, solar power cells, and/or a connection to a power grid.

A Wi-Fi device 165 allows wireless connections of one or more terminals based on IEEE 802.11 wireless communications standards to a wide area network (WAN) such as the Internet. The terminals may be or include, as an example, Wi-Fi transceivers in the communications module 130 of a vehicle 105, or in a mobile telephone of a user of the vehicle 105. The communication to the wide area network (WAN) may be, for example, via a cable or satellite communications network. The Wi-Fi device 165 includes a first transceiver to connect with the one or more terminals, and a second transceiver, for example a cable or satellite modem, to connect with the wide area network (WAN).

The server 170 can be a conventional computing device, i.e., including one or more processors and one or more memories, programmed to provide operations such as disclosed herein. Further, the server 170 can be accessed via the network 135, e.g., the Internet or some other wide area network. The server 170 can provide data, such as map data, weather data, calendar data, time-of-day data, traffic data, etc. to the infrastructure computer 150 or the vehicle computer 110. As described in additional detail below, the server 170 may additionally or alternatively, based on the map data, weather data, time-of-day data, traffic data, historical traffic data, etc., determine times to activate or deactivate the Wi-Fi devices 165 and send commands to the infrastructure device 140 to activate or deactivate the Wi-Fi devices 165. For example, based on calendar data, time-of-day data, and historical traffic data, the server 170 may determine that historically, a number of vehicles 105 travelling in the area at a time-of-day and/or on a day of the week (e.g., a workday) is greater than a threshold value, and send a command to the infrastructure device 140 to deactivate the Wi-Fi devices 165 in the area A1 based on the time-of-day and/or day of the week. As another example, the server 170 may, based on current (i.e., real time) traffic data, determine that a number of vehicles 105 travelling in the area is greater than a threshold value, or that a traffic flow density is greater than a threshold value. The traffic flow density is a number of vehicles on a fixed distance of road and may be measured in vehicles/kilometer.

In an example, the infrastructure computer 150 can be programmed to receive and/or collect data from the sensors 155 on the infrastructure device 140 related to one or more vehicles 105 proximate to the infrastructure device 140. A vehicle 105 is deemed "proximate" to the infrastructure device 140 when the vehicle 105 is detectable by the sensors 155 on the infrastructure device 140 and/or within range for point-to-point, short-range communications with the infrastructure device 140. For each vehicle 105, the received and/or collected data can include values for different operating parameters of the vehicle 105. An operating parameter is a datum or data that specifies a physical condition or measurement of operation of the vehicle 105 or a vehicle component 125 at a time. Non-limiting examples of operating parameters include activation state (actuated, on, off, idled), vehicle location, vehicle speed, vehicle heading, vehicle acceleration, vehicle position relative to a lane, a temperature, a pressure, an angle of one component relative to reference point (e.g., an angle of wheels relative to straight ahead), a wiper speed, a rotational velocity (e.g., engine speed in revolutions per minute), an amplitude (e.g., of an oscillation of a suspension), a frequency (e.g., a frequency of oscillation of a suspension), etc.

Additionally, the infrastructure computer 150 can be programmed to receive data from the sensors 155 including operating parameters for the radio frequency communications channel in the area A1. As described above, the operating parameters may include the received signal strength indicator (RSSI) of the signal or signals received in the radio frequency communications channel or the ratio of the use time of the radio frequency communications channel to the measurement period of the usage.

In some cases, the infrastructure computer 150 can further be programmed to collect traffic signal data. For example, the infrastructure computer 150 can be programmed to collect a state (red, yellow, green) of a traffic signal that affects or may affect a vehicle operating parameter at a time. The vehicle operating parameter such as velocity or acceleration, for example, may be affected by the state of a traffic signal which the vehicle 105 is approaching.

The infrastructure computer 150 can collect the vehicle data and radio frequency communications signal data. Based on the vehicle data and the radio frequency communications signal data, the infrastructure computer 150 can activate and/or deactivate one or more of the Wi-Fi devices 165. Deactivating the Wi-Fi devices 165 may reduce interference of the Wi-Fi devices 165 with short-range communications between vehicles 105.

In some cases, the infrastructure computer 150 may deactivate a group of Wi-Fi devices 165 within the area A1 for at a specified time and/or for a specified amount of time. A group of Wi-Fi devices as used herein means one or more Wi-Fi devices 165. For example, during a time of historically high traffic volume such as rush hour on a weekday, the server 170 may send a "group off" command instructing the infrastructure computer 150 to deactivate the group of Wi-Fi devices 165 in the area A1. In another example, the infrastructure computer 150 may detect a channel usage ratio (usage time/measurement time) of a channel to be greater than a threshold. Measurement time is an amount of time during which the usage was measured. Based on the channel usage ratio being greater than the threshold, the infrastructure computer 150 may deactivate the group of Wi-Fi devices 165. In yet another example, the infrastructure computer 150 may detect that the received signal strength indicator (RSSI) of the radio frequency communications channel above a threshold, indicating that there is high likelihood of interference with vehicles 105 in the area A1, and may deactivate the group of Wi-Fi devices 165.

Further for example, the infrastructure computer 150 may deactivate individual Wi-Fi devices 165a, 165b within the area A1 at times when a vehicle 105, or a number of vehicles 105 greater than a threshold amount, are known to be in the range R1, R2 of the respective Wi-Fi device 165a, 165b. The infrastructure computer 150 in the infrastructure device 140 (e.g., the infrastructure device 140a), may, based on sensors 155, determine a respective location and a respective velocity of each of the vehicles 105a, 105b, and 105c. The vehicle data may be collected by sensors 155 on a single infrastructure device 140a, 140b, or from sensors 155 on two or more infrastructure devices 140a, 140b. Based on the respective locations and respective velocities, the infrastructure computer 150 on, for example, the infrastructure device 140a, may estimate a timing for each of the vehicles 105 to be in the range R1 associated with the Wi-Fi device 165a and the range R2 associated with the Wi-Fi device 165b. Further, based on the estimated timings of the vehicles 105 passing through the ranges R1, R2, the infrastructure computer 150 may turn on (activate) and turn off (deactivate) the Wi-Fi devices 165a, 165b.

Figure 2:
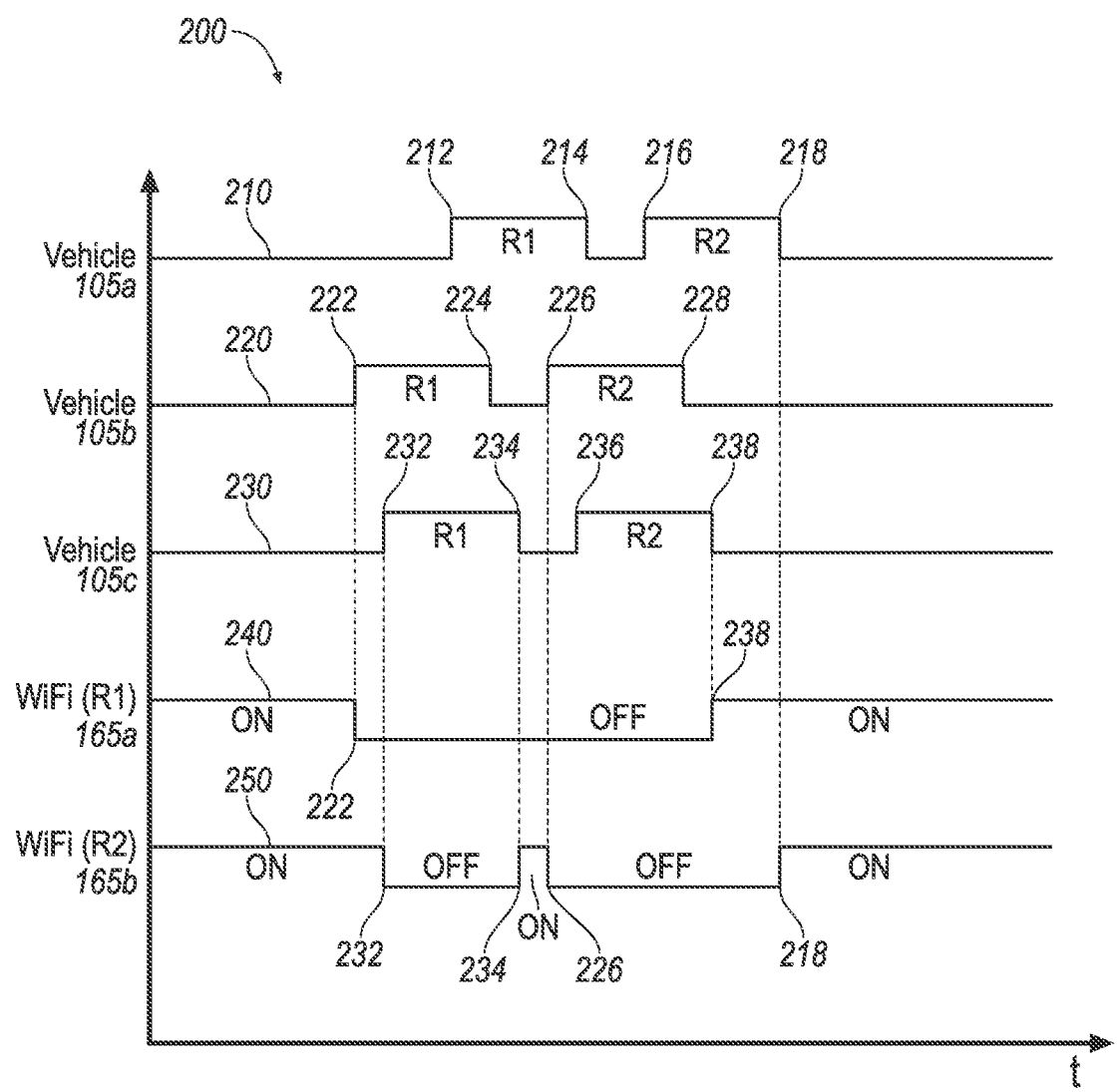
FIG. 2 is a timing example illustrating example timing for activating and deactivating Wi-Fi devices based on traffic conditions.

FIG. 2 is a timing diagram 200 of an example timing for turning Wi-Fi devices 165a, 165b on and off based on an estimated timing of vehicles 105a, 105b and 105c as they pass through the area A1. The timing of the respective vehicle 105a, 105b, 105c is an estimate of when the respective vehicle 105a, 105b, 105c will be at locations along a travel path of the respective vehicle 105a, 105b, 105c. The timing diagram 200 includes first, second, third, fourth and fifth timing signals 210, 220, 230, 240, 250. Each of the first, second and third timing signals 210, 220, 230 is a graphical representation of a timing of a respective vehicle 105a, 105b, 105c illustrating when the respective vehicle 105a, 105b, 105c will pass through the ranges R1 and R2. Each of the fourth and fifth timing signals 240, 250 is a graphical representation of a timing for activating and deactivating the Wi-Fi devices 165a, 165b in the respective ranges R1, R2 based on the first, second, and third timing signals 210, 220, 230. For ease of understanding, in the timing diagram 200, the Wi-Fi devices 165 are shown to be deactivated when a single vehicle 105 is in range of the respective Wi-Fi device 165. In a more typical case, the computer 150 may deactivate the Wi-Fi device 165 when a number of vehicles 105 in the range of the Wi-Fi device is greater than a threshold value n, where n is an integer value one or greater.

In the example, the vehicle 105a enters the range R1 associated with the first Wi-Fi device 165a at a time 212 and leaves the range R1 at time 214. The vehicle 105a further enters a range R2 associated with the second Wi-Fi device 165b at a time 216 and leaves the range R2 at a time 218.

The vehicle 105b is travelling behind the vehicle 105a. The vehicle 105b enters the range R1 at a time 222 and leaves the range R1 at a time 224. The vehicle 105b enters the range R2 at a time 226 and leaves the range R2 at a time 228.

The vehicle 105c is travelling in an opposite direction of the vehicles 105a, 105b. The vehicle 105c enters the range R2 at a time 232 and leaves the range R2 at a time 234. The vehicle 105c further enters the range R1 at a time 236 and leaves the range R1 at a time 238.

Based on the estimated timings of each of the vehicles 105a, 105b, 105c passing through each of the ranges R1, R2, the infrastructure computer 150 can determine a timing for turning the Wi-Fi devices 165a, 165b activating and deactivating as shown by the fourth and fifth timing signals 240, 250. In an example, the infrastructure computer 150 may be programmed to deactivate the Wi-Fi device 165a when one of the vehicles 105a, 105b, 105c is in the range R1, and deactivate the Wi-Fi device 165b when one of the vehicles 105a, 105b, 105c is in the range R2. In the example, the infrastructure computer 150 may be programmed to otherwise leave the Wi-Fi devices 165a, 165b on.

As shown in FIG. 2, based on the estimated timings of the vehicles 105a, 105b, 105c, the infrastructure computer 150 may deactivate the Wi-Fi device 165a at the time 222 when the vehicle 105b enters the range R1, and activate the Wi-Fi device 165b at the time 238 when the vehicle 105c leaves the range R1. The infrastructure computer 150 may further deactivate the Wi-Fi device 165b at the time 232 when the vehicle 105c enters the range R2, activate the Wi-Fi device 165b at the time 234 when the vehicle 105c leaves the range R2, deactivate the Wi-Fi device 165b at the time 226 when the vehicle 105b enters the range R2 and activate the Wi-Fi device 165b again at the time 218 when the vehicle 105a leaves the range R2.

This is only an example and is not intended to be limiting. For example, in higher volume traffic situations, the infrastructure computer 150 may be programmed to deactivate a Wi-Fi device 165 when a number of vehicles 105 are within a respective range for the Wi-Fi device 165 is greater than a threshold value n. The value "n" may be an integer greater than zero (e.g., 10). In another example, the infrastructure computer 150 may be programmed to deactivate Wi-Fi device 165 a first amount of time before a vehicle 105 is expected to enter the respective range and to activate the Wi-Fi device 165 a second amount of time after the Wi-Fi device 165 is expected to leave the respective range.

Figure 3:
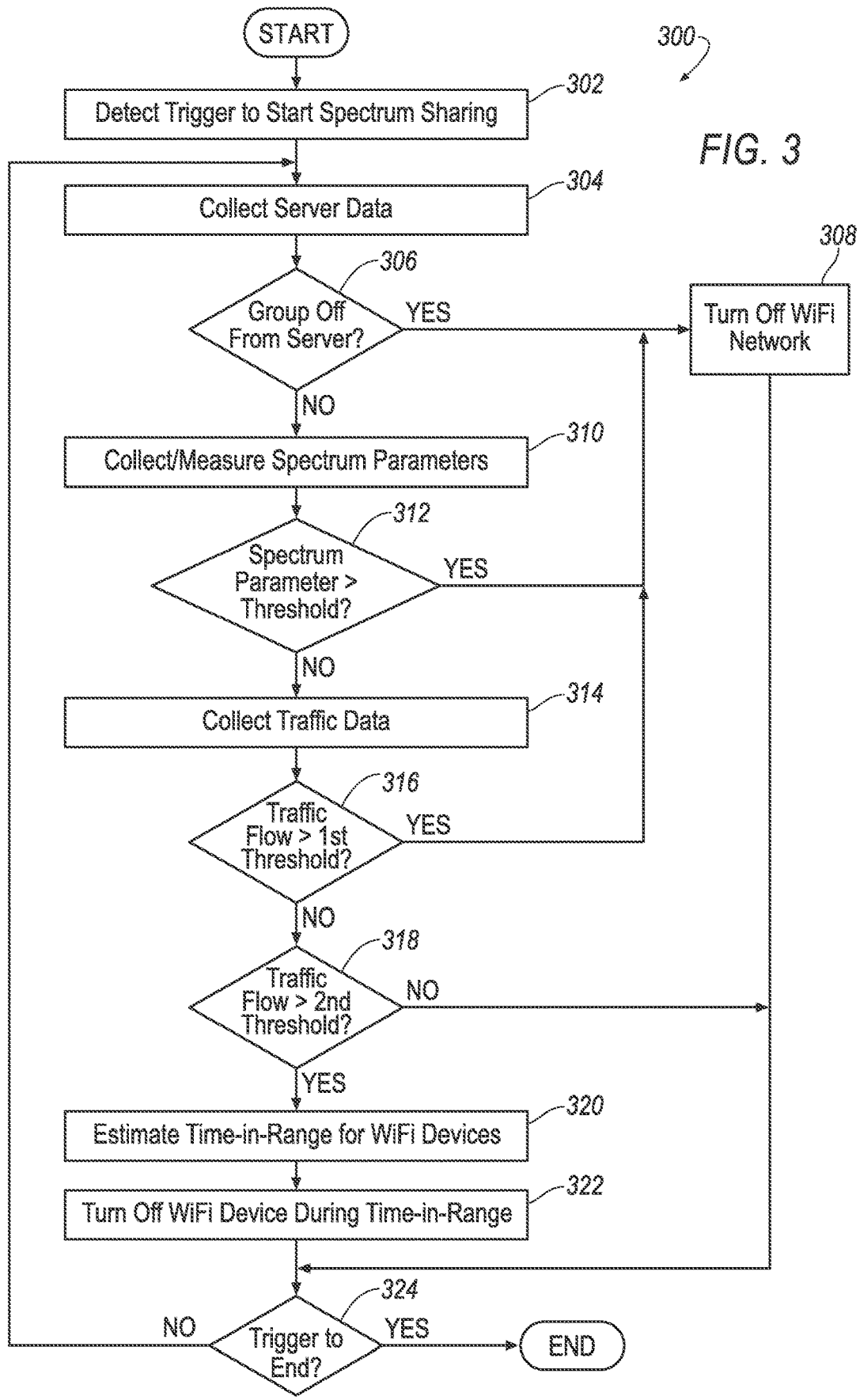
FIG. 3 a flowchart of an example process for activating and deactivating Wi-Fi devices based on potential interference with vehicle short-range communications.

FIG. 3 is a flow diagram of an example process 300 for activating and deactivating Wi-Fi devices 165 in the area A1 based on a potential level of interference of the Wi-Fi devices 165 with short-range communications from vehicles 105 travelling through the area A1. The process 300 starts in a block 302.

In the block 302, an infrastructure computer 150 in an infrastructure device 140 detects a trigger event to start the process 300. The trigger event may be a time-of-day. For example, the infrastructure computer 150 may be programmed to start the process 300 at 4:30 am. The time-of-day may be selected based, for example, on historical data indicating that traffic density exceeds a specified threshold in the area A1 in the morning in the 4-5 am hour. In another example, the trigger event may be a detected traffic level. For example, the infrastructure computer 150 may monitor a traffic level in the area A1. When traffic density exceeds a traffic density threshold, e.g., a number of vehicles 105 passing through the area A1 is greater than a threshold number of vehicles per minute (e.g., 5 vehicles per minute), the infrastructure computer 150 may start the process 300. As another example, the infrastructure computer 150 may be programmed to start the process 300 based on receiving a command from the server 170 to start the process 300. In another example, the process 300 may be triggered by boot-up of the computer 150, and may run continuously thereafter until the computer 150 is powered down or re-booted. The list of examples above is not intended to be limiting. The infrastructure computer 150 may be programmed to recognize other events as triggers to start the process 300. Upon detecting the trigger event, the process 300 continues in a block 304.

In the block 304, the infrastructure computer 150 collects data and/or receives commands from the server 170. The data and/or commands from the server 170 may include, for example, calendar data, time-of-day data, historical traffic data, etc. In an example, the data and/or commands may include a command to execute a "group off." Executing a "group off" means to deactivate all of the Wi-Fi devices 165 in a defined group. The defined group of Wi-Fi devices 165, may be, as an example, all (or a defined subset) of the Wi-Fi devices 165 in the area A1. In another example, the data and/or commands may include a historical traffic data indicating an historical amount of traffic at different times-of-day on different days of the week. For example, historical traffic data could be stored in a table or the like with a statistical representation, e.g., an average, of traffic density for an area A1 provided for each of the twenty-fours in a day for each of the seven days of the week. The process 300 continues in a block 306.

In the block 306, the infrastructure computer 150 determines whether to execute the "group off" command based on the data and/or commands from the server 170. In one example, the data and/or commands from the server 170 may include the "group off" command. In another example, the data and/or commands from the server 170 may be historical traffic data for the area A1. Based on the historical data, and, for example, calendar data and time-of-day data, the infrastructure computer 150 may determine that, at a current time, based on historical data, traffic is above a threshold that requires executing a "group off" command.

In the case that the infrastructure computer 150 determines, based on the server 170 data and/or commands, to execute the "group off" command, the process continues in a block 308. Otherwise, the process 300 continues in a block 310.

In the block 308, the infrastructure computer 150 sends a "group off" command to the group of Wi-Fi devices 165 in the area A1. The process 300 then continues in a block 322.

In the block 310, which may follow the block 306, the infrastructure computer 150 collects and/or measures data representing parameters of radio frequency signals in a radio frequency communications channel. The radio frequency communications channel may be a band of radio frequency signals that may be shared by short-range communications of the vehicles 105 and the Wi-Fi devices 165. For example, the 5.85-5.925 gigahertz (GHz) frequency band, currently allocated for dedicated short-range communications (DSRC), may, in the future, be designated for shared use between DSRC and unlicensed Wi-Fi devices 165. The infrastructure computer 150 may collect the data representing the parameters via sensors 155 included in the infrastructure device 140. The parameters of the radio frequency signals may include, for example, a received signal strength indicator (RSSI) of signals in the radio frequency communications band. As another example, the parameters may include a channel busy ratio. The channel busy ratio is a ratio of an amount of time the radio frequency communications band is being used to a measurement time. For example, in a case that the radio frequency communications band was being used for 0.6 seconds during a 1 second measurement period, the channel busy ratio would be (amount of time the frequency band is being used)/(the measurement period)= (0.6 seconds)/(1 second)=0.6. Other parameters of the frequency band to be shared may also be collected. The process continues in a block 312.

In the block 312, the infrastructure computer 150 is programmed to determine whether, based on the data representing the parameters of the radio frequency signals in the radio frequency communications band, one or more of the parameters exceeds a threshold. For example, the infrastructure computer 150 may determine whether the measured RSSI exceeds an RSSI threshold. The RSSI threshold may be a value determined empirically as a value above which, interference to short-range communications between vehicles 105 is likely to occur. For example, for a Wi-Fi coverage of 50 meters, a typical value of the RSSI threshold may be −70 decibel-milliwatts (dBm).

As another example, the infrastructure computer 150 may determine that the channel busy ratio exceeds a channel busy ratio threshold value. The channel busy ratio threshold may be, for example, determined empirically as a value above which, interference to short-range communications between vehicles 105 is likely to occur. A typical value of the channel busy ratio threshold is 0.7. Other values may be selected for the channel busy ratio threshold.

In a case that the infrastructure computer 150 determines that one of the parameters of the radio frequency signals in the radio frequency communications band exceeds the respective threshold, the process 300 continues in a block 308. Otherwise, the process 300 continues in a block 314.

In the block 314, the infrastructure computer 150 collects traffic data. The infrastructure computer 150 may collected the traffic data via sensors 155 included in the infrastructure device 140. For example, the infrastructure computer 150 may receive traffic data from radar sensors 155, LIDAR sensors 155 and camera sensors 155. The traffic data may include a number of vehicles 105 approaching an area (e.g., the area A1), and a number of vehicles in the area. The traffic data may further include, for example, a respective location of the vehicles 105, a respective velocity of the vehicles 105, etc. The process 300 continues in a block 316.

In the block 316, the infrastructure computer 150 may determine whether a traffic flow density approaching and/or in the area is greater than a first threshold. Approaching the area means that the vehicle 105 is driving toward the area and, at a current velocity, will arrive in the area within a predetermined period of time, for example, two minutes. The traffic flow density may be determined for vehicles approaching and/or in the area on a section of road. The first threshold may be a traffic flow density, above which the infrastructure computer 150 can be programmed to issue a "group off" command and deactivate the group of Wi-Fi devices 165 in the area, for example 20 vehicles/kilometer.

In the case that the infrastructure computer 150 determines that the traffic flow density for vehicles 105 approaching and/or in the area exceeds the first threshold, the process 300 continues in a block 308. Otherwise, the process 300 continues in a block 318.

In the block 318, the infrastructure computer 150 determines whether traffic flow density of vehicles 105 approaching and/or in the area A1 exceeds a second threshold. The second threshold may be smaller than the first threshold, for example, a traffic flow density of 10 vehicles/kilometer, and may be a value indicating that interference with the short-range communications of the vehicles 105 may occur at times when groups of vehicles 105 are within range of a Wi-Fi device 165, such as the Wi-Fi devices 165a, 165b, and not at other times. In this case, the respective Wi-Fi devices 165 should be activated and deactivated based on the location of groups of vehicles 105 within the area A1. In the case that the traffic flow density exceeds the second threshold, the process 300 continues in a 320. Otherwise, the process 300 continues in a block 324.

In the block 320, the infrastructure computer 150 estimates a time-in-range for vehicles 105 in the area. Time-in-range, as used herein, means a time when one or a group of vehicles 105 is within range of a Wi-Fi device 165, for example, within range R1 of the Wi-Fi device 165a as shown in FIG. 1.

Based on location and velocity data for each of the vehicles 105 in or approaching the area A1, the infrastructure computer 150 estimates a time when each of the vehicle 105 will be within the range R1. Based on the vehicle data, for example the data collected by the sensors 155 on the infrastructure devices 140a, 140b, the infrastructure computer 150 can determine a current location and current velocity of each vehicle 105. Based on the current location and velocity, the infrastructure computer 150 estimates a time when each vehicle 105 will enter and leave the range R1 based on equation 1, below:

$$t=(p_2-p_1)/v \qquad \text{eqn. 1}$$

where:

t is the time until the vehicle 105 reaches a location p2, p2 is a location of interest (e.g., a point of entry or a point of exit of the range R1), p1 is the current location, and v is the vehicle 105 velocity.

The infrastructure computer 150 can estimate a time when each vehicle 105 will be in the range R1. Based on the estimated times when each vehicle 105 will be in the range R1, the infrastructure computer 150 can further estimate when a number of vehicles 105 within the range R1 will exceed a third threshold.

Similarly, the infrastructure computer 150 may estimate times when the number of vehicles 105 in the range R2 for the second Wi-Fi device 165b exceeds a fourth threshold (which may be the same as the third threshold). The process 300 continues in a block 322.

In the block 322, the infrastructure computer 150 sends commands to deactivate the Wi-Fi devices 165a, 165b at times when the infrastructure computer 150 estimated that the number of vehicles 105 in the respective range R1, R2 exceeds the respective third or fourth thresholds. The process continues in a block 324.

In the block 324, the infrastructure computer 150 determines whether a trigger event has occurred to end the process 300. The trigger event may be, for example, a time-of-day when the traffic historically is below a threshold amount (for example, at 3:00 am when there may be a low amount of traffic). As another example, the trigger event may be that a number of vehicles 105 within the area has been below a threshold number of vehicles 105 for a predetermined period of time (e.g., less than three vehicles in any one-minute period for an hour). As another example, the trigger event may be an operator input requesting the process 300 end for servicing of the infrastructure device 140. Upon detecting the trigger event, the infrastructure computer 150 ends the process 300. Otherwise, process 300 continues in a block 304.

The process 300, as described above, may be executed by a computer 150 in an infrastructure device 140, for example, the computer 150 in the infrastructure device 140a. Alternatively or additionally, the process 300 can be executed in part by one or more second computers 150 in other infrastructure devices 140. Still further, the process 300 can be executed in part by other computers communicatively coupled to the computer 150, for example the server 170.

Further, other traffic conditions may be considered in determining when to activate and deactivate the Wi-Fi devices 165. For example, a Wi-Fi device 165 may be located at an intersection. When a traffic signal in the intersection changes to red in a direction, a number of vehicles 105 near the Wi-Fi device 165 may increase as vehicles 105 arrive in the intersection and wait for the traffic signal to turn green. In such a case, the computer 150 may consider a state of the traffic signal in determining when to deactivate the Wi-Fi device 165.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A computer comprising a processor and a memory, the memory including instructions such that the processor is programmed to:
   determine a potential loading of a radio frequency communications channel in an area by vehicle short-range communications according to a first protocol based on data collected by sensors on an infrastructure device; and
   activate or deactivate a Wi-Fi device that is in the area and separate from the computer and the infrastructure device, and that communicates according to a second protocol, based on the determination of the potential loading of the radio frequency communications channel.

2. The computer of claim 1, wherein the processor is further programmed to:
   deactivate the Wi-Fi device based on a command received from a server.

3. The computer of claim 1, wherein the processor is further programmed to:
   deactivate the Wi-Fi device based on historical data indicating a number of vehicles greater than a threshold value in the area at a time-of-day.

4. The computer of claim 1, wherein the collected data include a ratio of a usage time to a measurement time for the radio frequency communications channel.

5. The computer of claim 1, wherein the collected data includes a received signal strength indicator (RSSI) for signals received by one of the sensors on the infrastructure device at a time.

6. The computer of claim 1, wherein the data collected by the sensors on the infrastructure device includes a number of vehicles in the area.

7. The computer of claim 6, wherein the processor is further programmed to:
   estimate that the number of vehicles in the area will be greater than a threshold at a time; and
   deactivate a group of Wi-Fi devices in the area at the time.

8. The computer of claim 1, wherein the processor is programmed to:
   determine that the potential loading is above a first threshold at a time; and
   deactivate a group of one or more Wi-Fi devices in the area based on the determination.

9. The computer of claim 8, wherein the processor is further programmed to:
   determine that the potential loading is below the first threshold, and above a second threshold; and
   deactivate a Wi-Fi device included in the group of one or more Wi-Fi devices when a number of vehicles within range of the Wi-Fi device is above a third threshold based on the determination that the potential loading is below the first threshold, and above a second threshold.

10. The computer of claim 1, wherein the processor is further programmed to:
    determine, for one or more vehicles, based on a respective location and a respective velocity, an estimated time that each of the one or more vehicles will be in the area, wherein the potential loading of the radio frequency communications channel is based on the determination.

11. A method comprising:
    determining a potential loading of a radio frequency communications channel in an area by vehicle short-range communications according to a first protocol based on data collected by sensors on an infrastructure device; and
    activating or deactivating a Wi-Fi device that is in the area and separate from the computer and the infrastructure device, and that communicates according to a second protocol, based on the determination of the potential loading of the radio frequency communications channel.

12. The method of claim 11, further comprising:
    deactivating the Wi-Fi device based on a command received from a server.

13. The method of claim 11, further comprising:
    deactivating the Wi-Fi device based on historical data indicating a number of vehicles greater than a threshold value in the area at a time-of-day.

14. The method of claim 11, wherein the collected data include a ratio of a usage time to a measurement time for the radio frequency communications channel.

15. The method of claim 11, wherein the collected data includes a received signal strength indicator (RSSI) for signals received by one of the sensors on the infrastructure device at a time.

16. The method of claim 11, wherein the data collected by the sensors on the infrastructure device includes a number of vehicles in the area.

17. The method of claim 16, further comprising:
    estimating that the number of vehicles in the area will be greater than a threshold at a time; and
    deactivating a group of Wi-Fi devices in the area at the time.

18. The method of claim 11, further comprising:
    determining that the potential loading is above a first threshold at a time; and
    deactivating a group of one or more Wi-Fi devices in the area based on the determination.

19. The method of claim 18, further comprising:
    determining that the potential loading is below the first threshold, and above a second threshold; and
    deactivating a Wi-Fi device included in the group of one or more Wi-Fi devices when a number of vehicles within range of the Wi-Fi device is above a third threshold based on the determination that the potential loading is below the first threshold, and above a second threshold.

20. The method of claim 11, further comprising:
    determining, for one or more vehicles, based on a respective location and a respective velocity, an estimated time that each of the one or more vehicles will be in the area, wherein the potential loading of the radio frequency communications channel is based on the determination.

* * * * *